(12) United States Patent
Krohn et al.

(10) Patent No.: US 8,899,256 B2
(45) Date of Patent: Dec. 2, 2014

(54) CARTRIDGE HYDRAULIC COUPLER AND METHOD OF USE

(75) Inventors: Dan Krohn, Houston, TX (US); Øystein Bakke, Konsmo (NO); Stian Thorkilsen, Nodeland (NO)

(73) Assignee: Oceaneering International, Inc., Houston, TX (US)

( * ) Notice: Subject to any disclaimer, the term of this patent is extended or adjusted under 35 U.S.C. 154(b) by 0 days.

(21) Appl. No.: 13/321,959

(22) PCT Filed: Nov. 18, 2011

(86) PCT No.: PCT/US2011/061336
§ 371 (c)(1),
(2), (4) Date: Nov. 22, 2011

(87) PCT Pub. No.: WO2012/138386
PCT Pub. Date: Oct. 11, 2012

(65) Prior Publication Data
US 2014/0026975 A1    Jan. 30, 2014

Related U.S. Application Data

(60) Provisional application No. 61/472,066, filed on Apr. 5, 2011.

(51) Int. Cl.
*F16K 43/00*    (2006.01)
*F16L 37/32*    (2006.01)
*F16K 25/00*    (2006.01)
*F16K 51/00*    (2006.01)
*F16L 37/30*    (2006.01)
*F16L 37/34*    (2006.01)

(52) U.S. Cl.
CPC    *F16L 37/30* (2013.01); *F16L 37/34* (2013.01)

USPC .................................. 137/15.18; 137/614.04

(58) Field of Classification Search
USPC ............... 137/614.03, 614.04, 614.05, 454.2, 137/15.17, 15.18
See application file for complete search history.

(56) References Cited

U.S. PATENT DOCUMENTS

| 4,694,859 A | 9/1987 | Smith, III |
| 4,709,726 A * | 12/1987 | Fitzgibbons ............. 137/614.04 |
| 4,817,668 A | 4/1989 | Smith, III |

(Continued)

FOREIGN PATENT DOCUMENTS

| NO | 20011553 | 3/2001 |
| WO | 9521349 | 2/1995 |
| WO | 2009135003 A1 | 11/2009 |

*Primary Examiner* — Kevin Lee
*Assistant Examiner* — Michael R Reid
(74) *Attorney, Agent, or Firm* — Gary R. Maze; Berenbaum Weinshienk, PC (57) ABSTRACT

A male and female set of hydraulic coupler cartridges mate such that one part of the coupler can be left in place, e.g. the female coupler, with the other portion of the coupler, e.g. the male coupler, being removably connected or disconnected. Valves within each cartridge comprise an actuator and springs within each cartridge urge the valves into a closed, sealing position. When the cartridges mate, spring and/or fluid pressure within the cartridges operates to either allow or disallow fluid flow. Once the cartridges are mated, their respective springs are partially compressed and movement of one of the valves operates to compress one spring and correspondingly decompress the other. The cartridges can therefore be mated and unmated, e.g. subsea, while fluid flow is prevented through them during the mating and unmating.

17 Claims, 6 Drawing Sheets

(56) References Cited

U.S. PATENT DOCUMENTS

| | | |
|---|---|---|
| 4,832,080 A | 5/1989 | Smith, III |
| 4,884,584 A | 12/1989 | Smith |
| 4,900,071 A | 2/1990 | Smith, III |
| 5,052,439 A | 10/1991 | Smith, III |
| 5,099,882 A | 3/1992 | Smith, III |
| 5,203,374 A | 4/1993 | Smith, III |
| 5,469,887 A | 11/1995 | Smith, III |
| 5,692,538 A | 12/1997 | Smith, III |
| 5,762,106 A | 6/1998 | Smith, III |
| 5,829,480 A | 11/1998 | Smith, III |
| 5,899,228 A | 5/1999 | Smith, III |
| 5,979,499 A | 11/1999 | Smith |
| 5,983,934 A | 11/1999 | Smith, III |
| 6,085,785 A | 7/2000 | Smith, III |
| 6,095,191 A | 8/2000 | Smith, III |
| 6,106,026 A | 8/2000 | Smith, III |
| 6,123,103 A | 9/2000 | Smith, III |
| 6,202,691 B1 | 3/2001 | Smith, III |
| 6,206,040 B1 | 3/2001 | Smith, III |
| 6,227,245 B1 | 5/2001 | Smith, III |
| 6,237,632 B1 | 5/2001 | Smith, III |
| 6,283,444 B1 | 9/2001 | Smith, III |
| 7,168,449 B2 * | 1/2007 | Giagnoli et al. ......... 137/614.04 |
| 7,487,796 B2 * | 2/2009 | Imler et al. ............... 137/614.04 |

* cited by examiner

CARTRIDGE HYDRAULIC COUPLER AND METHOD OF USE

The invention claims priority through U.S. Provisional 61/472,066 entitled "Cartridge Hydraulic Coupler And Method Of Use" filed on Apr. 5, 2011.

FIELD OF THE INVENTION

The invention relates to cartridge hydraulic couplers and their method of use. More specifically, the invention relates to cartridge hydraulic couplers that can be used subsea where the couplers comprise a male and female member, each typically equipped with an opposing poppet valve.

BACKGROUND OF THE INVENTION

The invention relates to hydraulic couplers where one part of the coupler can be left in place with the other portion of the coupler being selectively connected or disconnected.

Coupling of hydraulic coupling cartridge assemblies, e.g. subsea, is a means to connect a hydraulic conduit line by use of a pair of complementary male and female couplings. This allows for a fluid blocking member, e.g. a female member, to remain engaged in a fluid pathway and, when coupled with a complementary male member, to allow for fluid to resume flowing which predetermined conditions are met.

Typically, fluid, if present, is under pressure in the fluid lines on either side of the coupler. Coupling devices for use in interconnecting conduit sections carrying fluid under pressure typically comprise a male and corresponding female body members interfitted and locked together in a communicating relationship. These body members are provided with interior check valves, most of which are of the ball type, which are urged into closed relation by resilient means and which open to provide flow. Some comprise poppet valves used as directional control valves to control movement of fluid within the connector.

In poppet valve applications, misalignment between the individual components of the valve cartridge assembly can create problems resulting in leakage. Leakage can occur, e.g., when the coupler is being mated or unmated.

BRIEF DESCRIPTION OF THE FIGURES

The figures supplied herein disclose various embodiments of the claimed invention in which like numbered elements are the same.

DETAILED DESCRIPTION OF VARIOUS EMBODIMENTS

Figure 1:
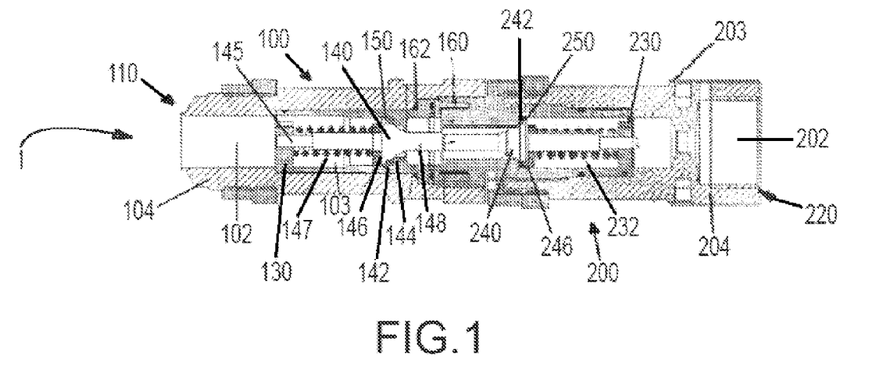
FIG. 1 is a view in partial perspective of a first coupled embodiment illustrating coupled male and female members.

Referring now to FIG. 1, hydraulic coupling cartridge assembly 1 comprises female member 100 and male member 200. In preferred embodiments, female member 100 and male member 200 are dimensioned and configured for use subsea and their dimensions allow for use with existing hydraulic couplings such as those used in mini, M1 and M2 junction plates marketed by Oceaneering International, Inc. of Houston, Tex. In various embodiments, hydraulic coupling cartridge assembly 1 provides for following minimum flow characteristics for nominal sizes (½ inch and 1 inch), e.g. a nominal ½ inch size may allow for a 1.9 $C_v$ and a nominal 1 inch size for a 5.5 $C_v$.

Hydraulic coupling cartridge assembly 1 allows connecting of a hydraulic conduit line (not shown in the figures) by use of male member 200 and female member 100. Typically, as described herein below, male member 200 comprises a probe section and a valve system, typically a poppet valve system, while female member 100 comprises a sealing system and a valve system, typically comprising a corresponding poppet valve system.

The described hydraulic coupling cartridge assembly 1 and its methods of use allow for installation, removal, and replacement of critical sealing components. Materials contemplated for use in manufacturing hydraulic coupling cartridge assemblies 1, such as their bodies, include those matched for wear and sliding, along with compatibility to salt water, surface conditions, and production and control fluids such as those used in stainless steel fluid couplings capable of being mounted in a mechanical operated junction plate.

A dual elastomer seal package, such as one comprising Peek® manufactured by Victre plc, may be used and hydraulic coupling cartridge assemblies 1 may also be configured with a c-cup style pressure energizing metal seal. Hydraulic coupling cartridge assembly 1 and its constituent parts may be used to provide redundancy in a sealing system.

Figure 2:
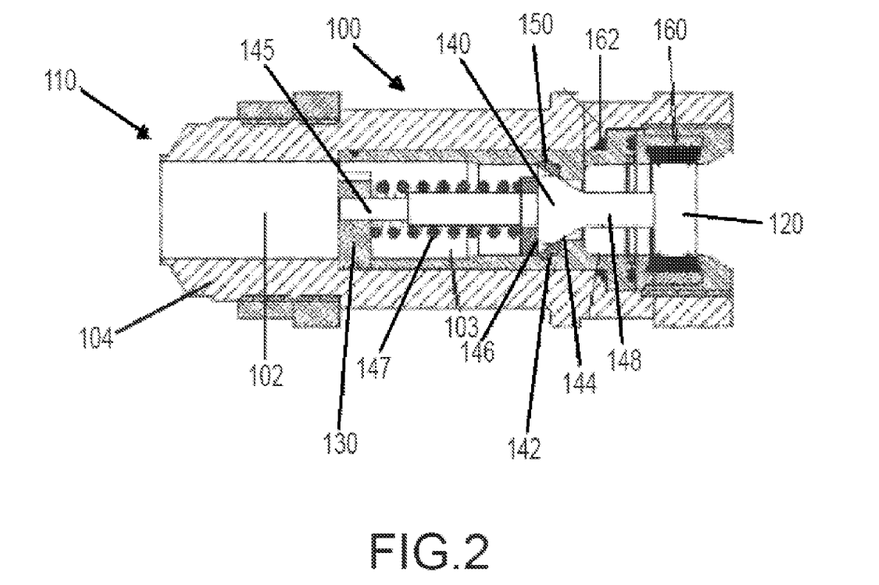
FIG. 2 is a view in partial perspective of a female coupler of the first coupled embodiment, comprising a female cartridge.

Referring to FIG. 2, in a first embodiment, female member 100 comprises female coupling member housing 104 which further comprises first open end 110 and second open end 120 disposed distally from first open end 110; inner bore 102; spring stop 130; first valve 140; valve seat 142; and spring 147. As illustrated, female member 100 further comprises female cartridge 101, as isolated and illustrated in FIG. 2a, which may be threaded on an outer surface portion of female cartridge 101 to be received into a correspondingly grooved portion of female coupling member housing 104 (FIG. 2), although other equivalent fastening arrangements, as will be familiar with one of ordinary skill in the connector arts, may be used to allow female cartridge 101 to be selectively inserted into and removed from female coupling member housing 104.

Figure 2A:
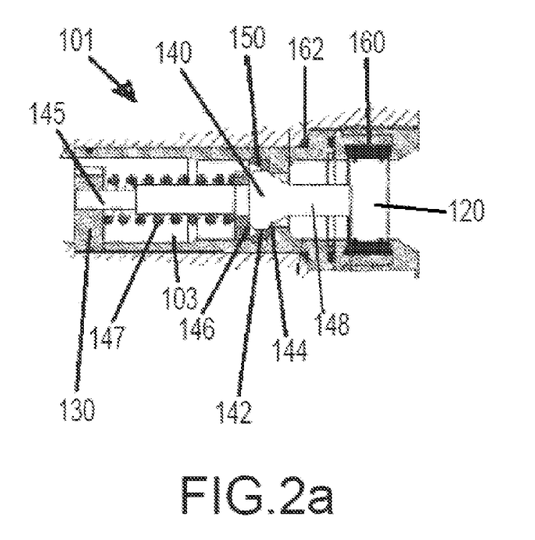
FIG. 2a is a cross-sectional view in partial perspective of an exemplary female cartridge.

Inner bore 102 effectively extends from first open end 110 to second open end 120 to provide a fluid pathway, e.g. extending through female annulus 103 to second open end 120. Female annulus 103 is substantially contiguous throughout female cartridge 101.

First valve 140 is typically slidably disposed within a portion of inner bore 102, e.g. female annulus 103, and comprises leading face 144 which is disposed proximate valve seat 142 and spring face 146 disposed opposite leading face 144. First valve 140 also typically comprises first valve actuator 148 extending from leading face 144.

Spring stop 130 is typically disposed intermediate first open end 110 and second open end 120 within inner bore 102.

Valve seat 142 is typically disposed within female annulus 103 at a first predetermined distance proximate second open end 120, intermediate first open end 110 and spring stop 130. Valve stem 145 extends from spring face 146 through at least some portion of spring stop 130.

Figure 3:
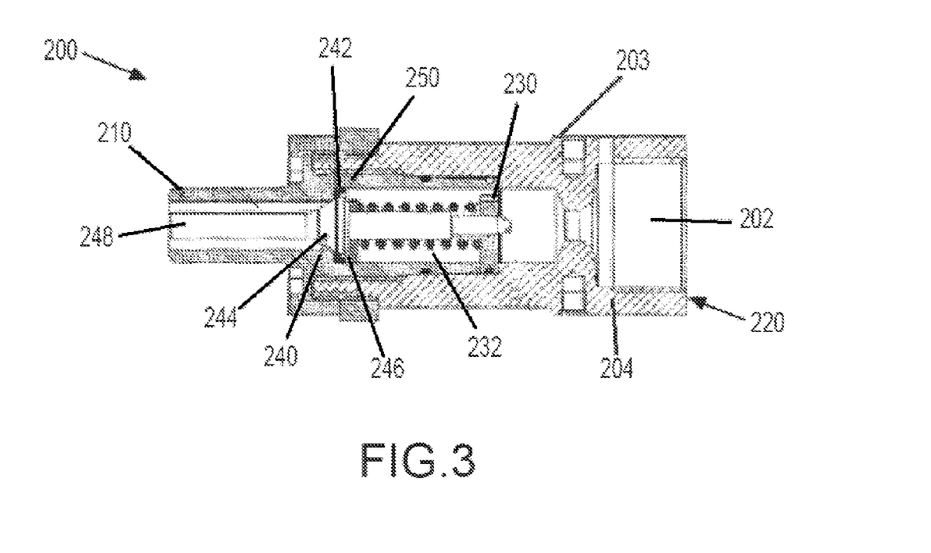
FIG. 3 is a view in partial perspective of a male coupler of the first coupled embodiment, comprising a male cartridge.

Spring 147 is typically disposed intermediate spring stop 130 and spring face 146 and is further dimensioned and configured such that movement of first valve 140 toward first open end 110 compresses spring 232 (FIG. 3) and movement of first valve 140 away from first open end 110 extends spring (FIG. 3).

In certain embodiments hydraulic coupling cartridge assembly 1 further comprises radial sealing member 150 disposed adjacent valve seat 142 of female member 100, where radial sealing member 150 is dimensioned and configured to sealingly engage with sealing surface 144 of first valve 140 of female member 100 when first valve 140 is urged against valve seat 142 of female member 100. Other seals, e.g. seals 160 and 162, may be present to aid in containing fluids flowing through hydraulic coupling cartridge assembly 1 within hydraulic coupling cartridge assembly 1.

Referring now to FIG. 3, in a preferred embodiment, male member 200 comprises inner bore 202; spring stop 230; valve seat 242; second valve 240; second valve actuator 248; and spring 232. Male member 200 comprises male cartridge 201, as isolated and illustrated in FIG. 3a. Male member 200 is preferably removably and sealingly received within second open end 120 (FIG. 2) of female member 100 (FIG. 2). Male cartridge 201 may be threaded on an outer surface of male cartridge 201 to be received into a correspondingly grooved portion of male coupling member housing 203 (FIG. 3), although other equivalent fastening arrangements may be used to allow male cartridge 201 to be selectively inserted into and removed from male coupling member housing 203. In certain embodiments, male cartridge annulus 204 is substantially contiguous within male cartridge 201.

Figure 3A:
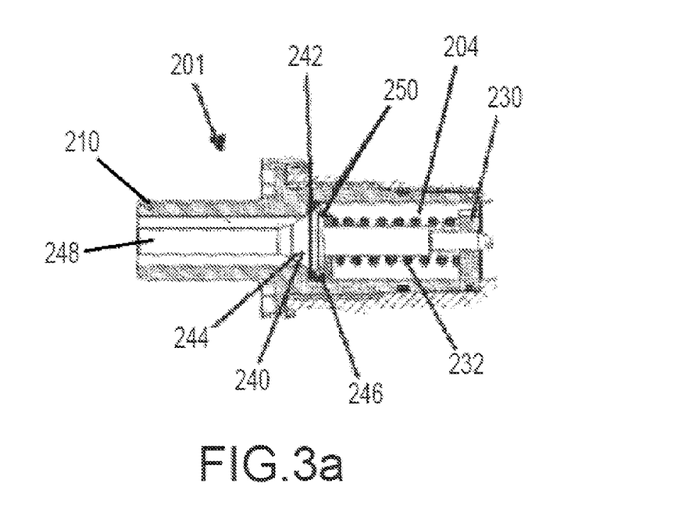
FIG. 3a is a cross-sectional view in partial perspective of an exemplary male cartridge.

In typical embodiments, first open end 210 of male member 200 is dimensioned and adapted to be sealingly received within female member second open end 120. Second open end 220 of male member 200 is disposed distally from first open end 210 and is preferably dimensioned and configured to receive a fluid inlet (not illustrated in the figures). Inner bore 202 effectively extends from first open end 210 to second open end 220 to provide a fluid pathway, e.g. extending through male annulus 204 to second open end 120.

Second valve 240 is typically slidably disposed within inner bore 202 and comprises leading face 244, which is disposed proximate valve seat 242, and spring face 246, which is disposed opposite leading face 244. Second valve actuator 248 extends from leading face 244 and is dimensioned and configured to engage first valve actuator 148 (FIG. 2) of female member 100 (FIG. 2) when male member 200 is received at a predetermined distance into female member 100.

Valve seat 242 is typically disposed within inner bore 202 at a first predetermined distance proximate first open end 210, intermediate first open end 210 and spring stop 230.

Spring 232 is typically disposed intermediate spring stop 230 and spring face 246 and dimensioned and configured such that movement of second valve 240 toward first open end 210 extends spring 232 and movement of second valve 246 away from first open end 210 compresses spring 232.

Spring stop 230 is typically disposed intermediate first open end 210 and second open end 220 within inner bore 202.

Additionally, radial sealing member 250 may be disposed adjacent valve seat 242 of male member 200. Valve seat 242 may be a radial seal dimensioned and configured to form a sealing engagement with sealing surface 244 of valve 240 of male member 200 when valve 240 is urged against valve seat 242.

Figure 4:
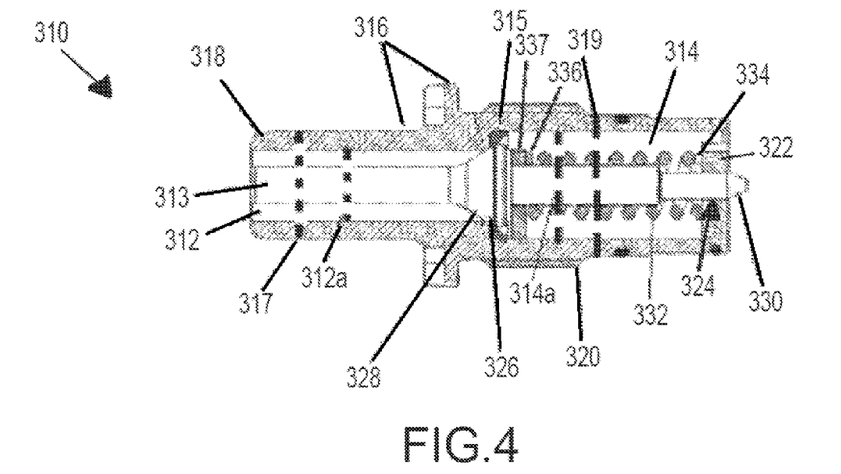
FIG. 4 is a view in partial perspective of a male coupler cartridge of a second embodiment.
Figure 5:
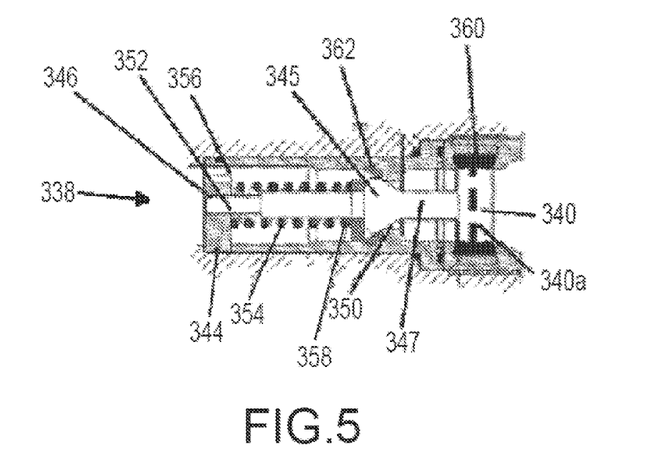
FIG. 5 is a view in partial perspective of a female coupler cartridge of the second embodiment.
Figure 5A:
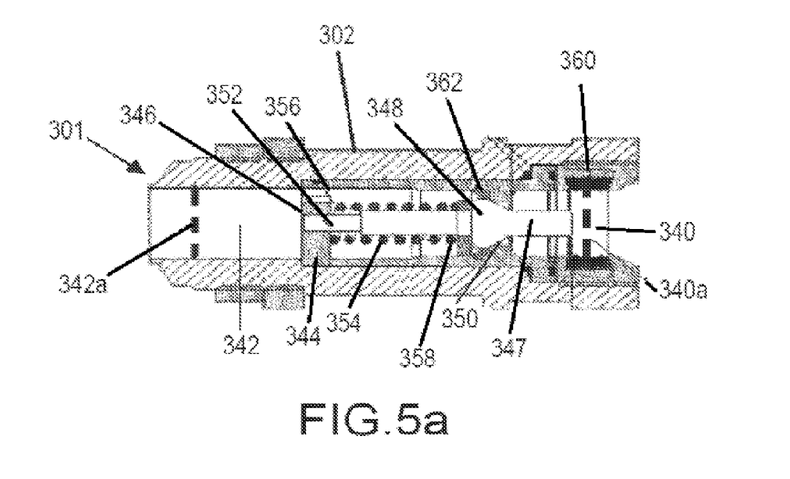
FIG. 5a is a view in partial perspective of a female coupler of the second embodiment which incorporates the female cartridge.

Referring now to FIGS. 4 and 5, in a second contemplated embodiment a hydraulic coupling cartridge assembly comprises male coupling cartridge 310 (FIG. 4) and female coupling cartridge 338 (FIG. 5). Male coupling cartridge 310 and female coupling cartridge 338 are typically at least partially housed in housings as illustrated in the various drawings. For example, as illustrated in FIG. 5a, female coupling cartridge 338 is housed in housing 302 of female member 301.

The hydraulic coupling cartridge assembly may be dimensioned and configured for use subsea.

Male coupling cartridge 310 comprises outer body 316; first inner bore region 312; male cartridge inner bore region 314; first anchoring member 322; first poppet valve 326; and first spring 332. Male coupling cartridge 310 may be threaded to be correspondingly received into a grooved portion of a male coupling housing.

Outer body 316 typically comprises insertion region 318, which further comprises first outer diameter 317, and protruding region 320, which further comprises second outer diameter 319 which is larger than first outer diameter 317. Protruding region 320 may be threaded to be received into a correspondingly grooved portion of male coupling member housing 303 (FIG. 4a).

First inner bore region 312 comprises first inner diameter 312a.

Male cartridge inner bore region 314 comprises second inner diameter 314a that is larger than first inner diameter 312a.

First anchoring member 322 is typically mounted in male cartridge inner bore 314 and comprises first central channel 324.

First poppet valve 326 is typically slidably mounted in male cartridge inner bore region 314 and comprises tapered sealing surface 328, first actuator 313 extending from tapered sealing surface 328, and shaft 330 extending through first central channel 324. Seals, e.g. seals 315, may further act to provide a sealing surface for first poppet valve 326 when first poppet valve 326 is closed.

First spring 332 typically comprises first end 334, which is engaged against first anchoring member 322, and second end 336, which is disposed opposite first end 334. Second end 336 may be attached to first poppet valve 326 but is preferably engaged against front guide 337, itself slidingly disposed within male cartridge inner bore region 314 and engaged against first poppet valve 326.

First spring 332 is dimensioned and configured such that movement of first poppet valve 326 toward first inner bore region 312 extends first spring 332 and movement of first poppet valve 326 away from first inner bore 312 compresses first spring 332.

Referring now to FIG. 5, female coupling cartridge 338 comprises first female coupling female cartridge inner bore region 340; second female coupling inner bore region 342; second anchoring member 344; second poppet valve 348; and second spring 354. Female coupling cartridge 338 may be threaded to be correspondingly received into a grooved portion of female coupling housing 302 (FIG. 5a).

Female cartridge inner bore region 340 is preferably longitudinally alignable with male coupling cartridge first inner bore region 312 (FIG. 4) and comprises first inner bore diameter 340a. In preferred embodiments, female cartridge inner bore region 340 is dimensioned and configured to snugly receive insertion region 318 (FIG. 4).

Second female coupling inner bore region 342 comprises second inner bore diameter 342a that is larger than female cartridge inner bore diameter 340a.

Second anchoring member 344 is typically mounted in second female coupling inner bore 342 and comprises second central channel 346. Second central channel 346 does not have to be dimensioned and configured to allow fluid flow through second central channel 346 and in preferred embodiments does not allow fluid flow through second central channel 346.

Second poppet valve 348 is typically slidably mounted in second female coupling inner bore 342 and comprises tapered sealing surface 350, second actuator 347 extending from tapered sealing surface 356, and shaft 352. Shaft 352 typically extends through second central channel 346.

Second spring 354 typically comprises first end 356, engaged against second anchoring member 344, and second end 358, disposed opposite first end 356 and engaged against second poppet valve 348 such that movement of second poppet valve 348 toward first poppet valve 326 extends second spring 354, and movement of second poppet valve 348 away from first poppet valve 326 compresses second spring 354.

First actuator 313 (FIG. 4) and second actuator 347 (FIG. 5) are dimensioned and configured to mutually engage once male coupling cartridge 310 and female coupling cartridge 338 are mutually engaged.

Female coupling cartridge 338 may further comprise first radial sealing member 360 mounted in female cartridge inner bore region 340 and positioned to form a sealing engagement with insertion region 318.

Second radial sealing member 362 may also be present and mounted in the second female coupling inner bore region 342. If present, second radial sealing member 362 may be positioned to form a sealing engagement with sealing surface 350 of second poppet valve 348 when second poppet valve 348 is closed.

Figure 6:
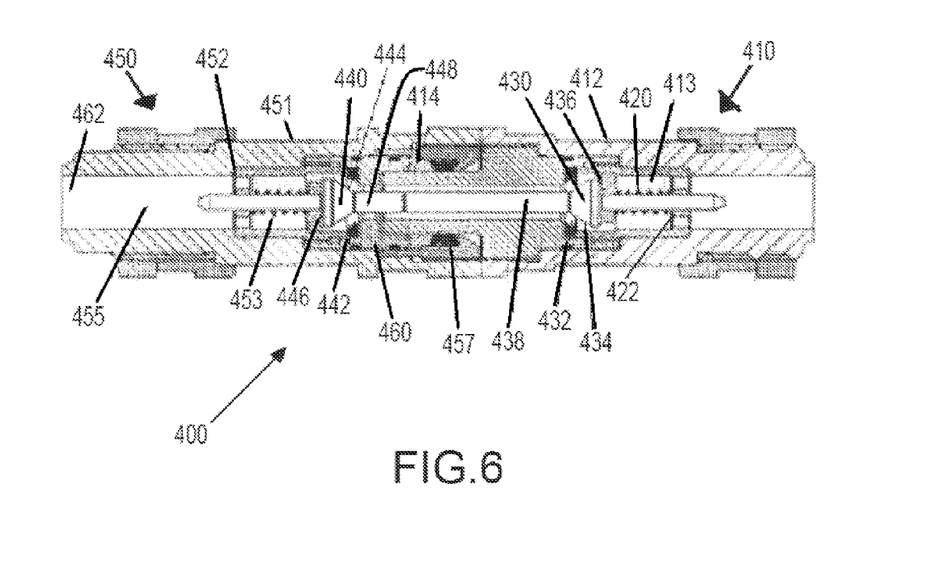
FIG. 6 is a view in partial perspective of a coupled third embodiment.

Referring now to FIG. 6, in a third embodiment hydraulic coupling cartridge assembly 400 comprises male member 410 and female member 450.

Male member 410 further comprises male housing 412; first spring stop 422; valve seat 432; first valve 430; and first spring 420.

First spring stop 422 is typically disposed within annulus 413.

Valve seat 432 is typically disposed within annulus 413 intermediate first open male housing end 414 and first spring stop 422.

First valve 430 is typically slidably disposed within annulus 413 and comprises leading face 434, disposed proximate valve seat 432; spring face 436, which is disposed distally from leading face 434; and first valve actuator 438, which extends from leading face 434.

First spring 420 is typically disposed intermediate first spring stop 422 and first valve spring face 436. First spring 420 is typically dimensioned and configured such that movement of first valve 430 toward first open male housing end 414 extends first spring 420 and movement of first valve 430 away from first open male housing end 414 compresses first spring 420.

Female member 450 comprises female housing 451; second spring stop 452; valve seat 442; second valve 440; and second spring 453.

Female housing 451 is typically dimensioned and configured to receive a predetermined portion of male housing 412 therein, e.g. 414. Female housing 451 further comprises annulus 455 therethrough. Female member 450 further comprises first open female housing end 460 and second open female housing end 462, each open female housing end 460, 462 in fluid communication with annulus 455, and seal 457 dimensioned and configured to occlusively seal the predetermined portion of male housing 412, e.g. 414, when male housing 412 is received into female housing 451.

Second spring 453 is typically disposed within annulus 455.

Valve seat 442 is typically disposed within annulus 455 intermediate first open female housing end 460 and second spring stop 452.

Second valve 440 is typically slidably disposed within annulus 455 and comprises leading face 444 disposed proximate valve seat 442, spring face 446 distally disposed from leading face 444, and second valve actuator 448 extending from leading face 444. Second valve actuator 448 is dimensioned and configured to engage a corresponding end of male member first valve actuator 438 when the predetermined portion of male housing 412, e.g. 414, is received into female housing 451.

Second spring 453 is typically disposed intermediate second spring stop 452 and second valve spring face 446 and is typically dimensioned and configured such that movement of second valve 440 toward first open female housing end 460 extends second spring 453 and movement of second valve 440 away from first open female housing end 460 compresses second spring 453.

In the operation of preferred embodiments, referring again generally to FIG. 1, in most typical operations male coupling cartridge 200 and female coupling cartridge 100, e.g. installed in their respective housings 204,104 (FIGS. 2,3), will have actuators 3,33 which cooperatively engage such that movement in a direction along a common longitudinal axis operates to close one of the valves 240,140 (FIGS. 2,3) and open the other.

In a first preferred method for controlling fluid flow, female coupling cartridge 100 is mated into a subsea assembly (not shown in the figures). Male coupling cartridge 200 is maneuvered to a position proximate female coupling cartridge 100, e.g. via use of a remotely operated vehicle (not shown in the figures), where male coupling cartridge 200 is configured and dimensioned for fluid communication with a fluid conduit, as described herein above. Female coupling cartridge 100 and male coupling cartridge 200 may be any of the hydraulic coupling cartridge assemblies described herein above.

Once in position, female and male coupling cartridges 100,200 are mated by aligning probe 210 of male coupling cartridge 200 with a predetermined longitudinal axis of first inner bore 120 of female coupling cartridge 100 and advancing at least one of female or male coupling cartridges 100,200 until first and second actuators 148,248 are slidably and mutually engaged along a substantially common longitudinal axis at their respective engagement ends. Female coupling inner bore 120 will form a substantially common annulus with male coupling inner bore 202 when female and male coupling cartridges 100,200 are mated.

First and second actuators 148,248 are engaged at their respective engagement ends to urge both first and second valves 140,240, which are typically poppet valves, into respective positions where their respective tapered sealing surfaces 144,244 are disengaged from their respective seals 150,250 when first and second actuators 148,248 are engaged to either compress first spring 147 in a first longitudinal direction with respect to a substantially common central axis of male and female coupling inner bores 120,202 or compress second spring 232 in a second longitudinal direction with respect to the substantially common central axis. In the first instance, compression is limited by first anchor 130 at a first compression, and second spring 232 correspondingly decompressed along the first longitudinal direction. In this first instance, decompression is limited by second sealing face 246 sealing against second seal 242 at a first predetermined decompression.

In the second instance, compression is limited by second anchor 230 at a second predetermined compression, and first spring 147 correspondingly decompressed along the second longitudinal direction. In this second instance, decompression is limited by first sealing face 142 sealing against first seal 150 at a second predetermined decompression.

In typical embodiments, when female and male coupling cartridges 100,200 are mated, the movement of first and second valves 140,240 is limited and first and second valves 140,240 cannot seal against their respective valve seats 142, 242, irrespective of fluid pressure.

In other embodiments, fluid flow through female coupling inner bore 102 and male coupling inner bore 202 is allowed until fluid pressure within female coupling inner bore 102 and male coupling inner bore 202 is sufficient to either urge first actuator 148 against second actuator 248 and overcome pressure exerted by second spring 232 against second valve 240 and allow first sealing surface 144 to seal against first seal 150, or urge second actuator 248 against first actuator 148 and overcome the pressure exerted by first spring 132 against first valve 140 and allow second sealing surface 244 to seal against second seal 250.

In a first preferred method of replacing a portion of a mateable coupling cartridge subsea, first male coupling cartridge 200 is decoupled from female coupling cartridge 100 to which first male coupling cartridge 200 is current coupled. Female coupling cartridge 100 and male coupling cartridge 200 may be any of the hydraulic coupling cartridge assemblies described herein above.

If fluid pressure exists within inner annulus 102 of female coupling cartridge 100, first valve 140, disposed within female coupling cartridge 100, is urged to a sealed position by allowing the fluid pressure in female coupling cartridge 100 to force sealing face 144 of first valve 140 against first seal 150, which as described herein is disposed within inner annulus 102 of female coupling cartridge 100, thereby forming an occlusive seal as first male coupling cartridge 200 and female coupling cartridge 100 are decoupled.

If fluid pressure exists within inner annulus 202 of first male coupling cartridge 200, second valve 240, disposed within first male coupling cartridge 200 as described herein, is urged to a sealed position by allowing the fluid pressure in first male coupling cartridge 200 to force sealing face 244 of second valve 240 against second seal 250 disposed within inner annulus 202 of first male portion 200 to form an occlusive seal as first male coupling cartridge 200 and female coupling cartridge 100 are decoupled.

After first male coupling cartridge 200 is decoupled from female coupling cartridge 100, a second male coupling cartridge 200 may be subsequently coupled to female coupling cartridge 200 by longitudinally aligning probe portion 210 of second male coupling cartridge 200 within first inner bore 102 of female coupling cartridge 100 until first actuator 148, operatively in communication with first valve 140 and disposed at least partially within female coupling cartridge 100, and second actuator 248, operatively in communication with second valve 240 and disposed at least partially within second male coupling cartridge 200, are slideably engaged along a substantially common longitudinal axis of probe 210 and first inner bore 102. Female coupling inner bore 102 will form a substantially common annulus with male coupling inner bore 202 when female and second male coupling cartridges 100, 200 are mated.

Fluid flow is then allowed through second male coupling cartridge 200 and female coupling cartridge 100 when fluid pressure within the coupled second male coupling cartridge 200 and female coupling cartridge 100 is sufficient to urge first actuator 148 against second actuator 248, thereby overcoming a force exerted by first spring 132 against first valve 140 and a force exerted by second spring 232 against second valve 240.

As used herein above, the second male coupling cartridge 200 may a different male coupling cartridge 200 or the first male coupling cartridge 200.

The foregoing disclosure and description of the inventions are illustrative and explanatory. Various changes in the size, shape, and materials, as well as in the details of the illustrative construction and/or a illustrative method may be made without departing from the spirit of the invention.

What is claimed is:

1. A hydraulic coupling cartridge assembly, comprising:
   a. a male member, the male member further comprising:
      i. a male housing, the male housing comprising:
         1. a first annulus therethrough; and
         2. a first open male housing end; and
         3. a second male housing open end adapted to receive a first fluid conduit, each of the first and second open male housing ends in fluid communication with the first annulus;
      ii. a selectively removable male cartridge disposed within the male housing, the male cartridge comprising:
         1. a male cartridge annulus in fluid communication with the first annulus;
         2. a first spring stop disposed within the male cartridge annulus, the first spring stop comprising a first guide channel therethrough;
         3. a first valve seat disposed within the male cartridge annulus intermediate the first open male housing end and the first spring stop;
         4. a first valve slidably disposed within the male cartridge annulus, the first valve comprising:
            a. a leading face disposed proximate the first valve seat;
            b. a first valve actuator extending from the leading face;
            c. a spring face distally disposed from the leading face; and
            d. a first valve guide extending from the spring face, at least a portion of the first valve guide extending through the first guide channel;
         5. a first spring disposed intermediate the spring stop and the first valve spring face within the male cartridge annulus, the first spring dimensioned and configured to receive the first valve guide therethrough and further dimensioned and configured such that movement of the first valve toward the first open male housing end extends the first spring and movement of the first valve away from the first open male housing end compresses the first spring; and
   b. a female member, comprising:
      i. a female housing dimensioned and configured to securely receive a predetermined portion of the male housing therein, the female housing comprising:
         1. a second annulus therethrough;
         2. a first open female housing end adapted to receive a second fluid conduit; and
         3. a second open female housing end adapted to receive the male housing, each of the first and second open female housing ends in fluid communication with the second annulus; and 4. a seal disposed within the second annulus, the seal dimensioned and configured to occlusively seal the predetermined portion of the male housing when it is couplingly received into the female housing;
ii. a selectively removable female cartridge disposed within the second annulus, the female cartridge comprising:
1. a female cartridge annulus in fluid communication with the second annulus;
2. a second spring stop disposed within the female cartridge annulus, the second spring stop comprising a second guide channel;
3. a second valve seat disposed within the female cartridge annulus intermediate the first open female housing end and the second spring stop;
4. a second valve slidably disposed within the female cartridge annulus, the second valve comprising:
   a. a second leading face disposed proximate the second valve seat;
   b. a second valve actuator extending from the second leading face, the second valve actuator dimensioned and configured to engage an end of the male member first valve actuator when the predetermined portion of the male housing is received at a predetermined distance into the female housing;
   c. a second spring face distally disposed from the second leading face; and
   d. a second valve guide extending from the second spring face, at least a portion of the second valve guide extending through the second guide channel;
5. a second spring disposed intermediate the second spring stop and the second valve spring face within the female cartridge annulus, the second spring dimensioned and configured to receive the second valve guide therethrough and further dimensioned and configured such that:
   a. movement of the second valve toward the first open female housing end extends the second spring and movement of the second valve away from the first open female housing end compresses the second spring, and
   b. when the female and male members are mated, the movement of first and second valves is limited such that the first and second valves cannot seal against their respective valve seats, irrespective of fluid pressure.

2. The hydraulic coupling cartridge assembly of claim 1 further comprising a first radial sealing member mounted in the male cartridge annulus and positioned to form a sealing engagement with a sealing surface of the first valve when the first valve is closed.

3. The hydraulic coupling cartridge assembly of claim 2 further comprising a second radial sealing member mounted in the female cartridge annulus and positioned to form a sealing engagement with the sealing surface of the second valve when the second valve is closed.

4. The hydraulic coupling cartridge assembly of claim 1, wherein the female and male cartridges each further comprise a fastener dimensioned and configured to engage a cooperative receiving portion of their respective housings, the fastener dimensioned and configured to allow selective removal and replacement of each cartridge subsea without disconnecting either housing from a fluid conduit to which the respective housing is attached.

5. The hydraulic coupling cartridge assembly of claim 1, where at least one of the male cartridge and the female cartridge is removably mounted within that cartridge's respective housing and adapted to allow removal of the cartridge from its respective housing without disconnecting that housing from a fluid conduit to which that housing is attached.

6. A hydraulic coupling cartridge assembly, comprising:
a. a female member, comprising:
   i. a female housing comprising a first open end adapted to couple with a first fluid conduit and a second open end disposed distally from the first open end, the female housing further comprising an inner fastener receiver;
   ii. a first inner bore extending from the first open end to the second open end;
   iii. a selectively removable female cartridge disposed at least partially within the female member housing, the female cartridge comprising:
      1. a female cartridge body comprising a fastener dimensioned and configured to selectively and cooperatively interface with the female housing inner fastener receiver;
      2. a female cartridge inner bore region substantially contiguous through the female cartridge and in fluid communication with the first inner bore region;
      3. a first spring stop disposed intermediate the first open end and the second open end within the female cartridge inner bore region;
      4. a first valve seat disposed within the female cartridge inner bore region intermediate the first open end and the first spring stop at a first predetermined distance proximate the first open end;
      5. a first valve slidably disposed within the female cartridge inner bore region, the first valve comprising a first leading face disposed proximate the first valve seat and a first spring face distally disposed from the leading face;
      6. a first valve actuator extending from the first leading face;
      7. a first spring disposed intermediate the first spring stop and the first valve spring face at least partially within the female cartridge inner bore region, the first spring dimensioned and configured such that movement of the first valve toward the first open end extends the first spring and movement of the first valve away from the first open end compresses the first spring; and
b. a male member further comprising:
   i. a male housing, comprising:
      1. a first male member open end dimensioned and configured to be removably received within the female member first open end; and
      2. a second male member open end adapted to receive a second fluid conduit and disposed distally from the first male member open end, the male housing further comprising a male housing inner fastener receiver;
   ii. a second inner bore extending from the first male member open end to the second male member open end; and
   iii. a selectively removable male cartridge disposed within the male housing, the male cartridge comprising:

1. a male cartridge body comprising a fastener dimensioned and configured to selectively and cooperatively interface with the male housing inner fastener receiver;
2. a male cartridge inner bore region substantially contiguous through the male cartridge and in fluid communication with the second inner bore region;
3. a second spring stop disposed at least partially within the male cartridge inner bore region intermediate the first male member open end and the second male member open end within the second inner bore;
4. a second valve seat disposed within the male cartridge inner bore intermediate the first male member open end and the second spring stop at a first predetermined distance proximate the first male member open end;
5. a second valve slidably disposed within the male cartridge inner bore, the second valve comprising a second leading face disposed proximate the second valve seat and a second spring face distally disposed from the second leading face;
6. a second valve actuator extending from the second leading face, the second valve actuator dimensioned and configured to engage the female member first valve actuator when the male member is received at a predetermined distance into the female member; and
7. a second spring disposed intermediate the second spring stop and the second valve spring face at least partially within the male cartridge inner region, the second spring dimensioned and configured such that movement of the second valve toward the male member first open end extends the second spring and movement of the second valve away from the male member first open end compresses the second spring;
8. the first valve and second valve further are configured such that movement of the first valve and the second valve is limited such that the first and second valves cannot seal against their respective valve seats, irrespective of fluid pressure when the female and male members are mated.

7. The hydraulic coupling cartridge assembly of claim 6, wherein:
   a. the male cartridge is selectively removably disposed within the male housing; and
   b. the female cartridge is selectively removably disposed within the female housing.

8. The hydraulic coupling cartridge assembly of claim 6, further comprising a first radial sealing member disposed adjacent the female member valve seat, the first radial sealing member dimensioned and configured to form a sealing engagement with a sealing surface of the female member first valve when the poppet valve is urged against the female member valve seat.

9. The hydraulic coupling cartridge assembly of claim 6, further comprising a second radial sealing member disposed adjacent the second valve seat, the second radial sealing member dimensioned and configured to form a sealing engagement with a sealing surface of the second first valve when the second valve is urged against the second valve seat.

10. The hydraulic coupling cartridge assembly of claim 6, wherein the male member is dimensioned and configured to allow it to be sealingly received within the female member first open end when the male member and female member are mated.

11. The hydraulic coupling cartridge assembly of claim 6, wherein the female and male members are dimensioned and configured for use subsea.

12. A hydraulic coupling cartridge assembly, comprising:
   a. a substantially tubular male coupling housing comprising a first open male housing end and a second male housing end adapted to receive a first fluid conduit;
   b. a male coupling cartridge dimensioned and adapted to be received and selectively fastened at least partially within the male coupling housing, the male coupling cartridge comprising:
      i. an outer body, the outer body comprising:
         1. an insertion region, further comprising a first outer diameter;
         2. a protruding region, further comprising a second outer diameter larger than the first outer diameter; and
         3. a threaded portion disposed about an outer surface of the outer body dimensioned and configured to be selectively received in a correspondingly dimensioned and configured grooved portion of an inner portion of the tubular male coupling housing;
      ii. a first inner bore region comprising a first inner diameter, the first inner bore region extending at least partially through the outer body;
      iii. a second inner bore region comprising a second inner diameter that is larger than the first inner bore region first inner diameter, the second inner bore region extending at least partially through the outer body;
      iv. a first anchoring member mounted in the second inner bore, the first anchoring member comprising a first central channel;
      v. a first poppet valve slideably mounted in the second inner bore region, the first poppet valve further comprising:
         1. a tapered sealing surface;
         2. a spring face disposed opposite the tapered sealing surface;
         3. a first actuator extending from the tapered sealing surface; and
         4. a shaft extending from the spring face at least partially through the first central channel;
      vi. a first spring, the first spring further comprising:
         1. a first end attached to the first anchoring member; and
         2. a second end disposed opposite the first end, the second end in communication with the spring face;
         3. the spring dimensioned and configured such that movement of the first poppet valve toward the first inner bore region extends the first spring, and movement of the first poppet valve away from the first inner bore compresses the first spring; and
   c. a substantially tubular female coupling housing, the female coupling housing comprising a first open female housing end adapted to receive a second fluid conduit and a second female housing end dimensioned and adapted to receive a predetermined portion of the male coupling cartridge and fixedly secure the female coupling housing to the male housing;
   d. a female coupling cartridge dimensioned and adapted to be received and selectively fastened at least partially within the male coupling housing, the female coupling cartridge comprising:
      i. a female cartridge outer body further comprising a threaded portion disposed about an outer surface of the female cartridge outer body dimensioned and configured to be selectively received in a correspondingly dimensioned and configured grooved portion of an inner portion of the tubular female coupling housing;

ii. a first female coupling inner bore region disposed within the female cartridge outer body and longitudinally alignable with a corresponding longitudinal axis of the male coupling cartridge first inner bore region, the first female coupling inner bore region further comprising a first inner bore diameter dimensioned and configured to snugly receive the male coupling cartridge outer body insertion region;

iii. a second female coupling inner bore region comprising a second inner bore diameter that is larger than the first female coupling inner bore diameter;

iv. a second anchoring member mounted in the second female coupling inner bore, the anchoring member comprising a second central channel;

v. a second poppet valve slideably mounted in the second female coupling inner bore, the second poppet valve comprising:
   1. a tapered sealing surface;
   2. a spring face disposed opposite the tapered sealing surface;
   3. a second actuator extending from the tapered sealing surface, the second actuator dimensioned and configured to engage the male coupling member first actuator once the male coupling cartridge is received at a predetermined distance into the female coupling cartridge; and
   4. a shaft disposed opposite the tapered sealing surface and extending through the second central channel; and vi. a second spring, further comprising:
   1. a first end attached to the second anchoring member; and
   2. a second end disposed opposite the first end and in communication with the spring face of the second poppet valve;
   3. the spring dimensioned and configured such that movement of the second poppet valve toward the first poppet valve extends the second spring, and movement of the second poppet valve away from the first poppet valve compresses the second spring.

13. The hydraulic coupling cartridge assembly of claim 12 further comprising a first radial sealing member mounted in the second inner bore region and positioned to form a sealing engagement with the sealing surface of the first poppet valve when the first poppet valve is closed.

14. The hydraulic coupling cartridge assembly of claim 12, further comprising a second radial sealing member mounted in the second female coupling inner bore region and positioned to form a sealing engagement with the sealing surface of the second poppet valve when the second poppet valve is closed.

15. The hydraulic coupling cartridge assembly of claim 12, wherein the female and male members are dimensioned and configured for use subsea.

16. A pairable male cartridge and female cartridge, comprising:
   a. a male cartridge, comprising:
      i. a male cartridge body adapted to be removably received into a male member housing, the male cartridge further comprising a fastener on an exterior portion of the male cartridge body, the fastener adapted to removably secure the male cartridge body to the male housing without disconnecting the male housing from a fluid conduit to which the male housing is attached;
      ii. a male cartridge annulus extending throughout the male cartridge body;
      iii. a first spring stop disposed within the male cartridge annulus, the first spring stop comprising a first guide channel therethrough;
      iv. a first valve seat disposed within the male cartridge annulus;
      v. a first valve slidably disposed within the male cartridge annulus, the first valve comprising:
         1. a leading face disposed proximate the first valve seat;
         2. a first valve actuator extending from the leading face and extending a predetermined distance from the leading face;
         3. a spring face distally disposed from the leading face; and
         4. a first valve guide extending from the spring face, at least a portion of the first valve guide extending through the first guide channel;
      vi. a first spring disposed intermediate the first spring stop and the first valve spring face within the male cartridge annulus, the first spring dimensioned and configured to receive the first valve guide therethrough and further dimensioned and configured such that movement of the first valve toward the first valve seat end extends the first spring and movement of the first valve away from the first valve seat compresses the first spring; and
   b. a female cartridge, comprising:
      i. a female cartridge body adapted to be selectively removably received into a female member housing, the female cartridge further comprising a fastener on an exterior portion of the female cartridge body, the fastener adapted to removably secure the female cartridge body to the female housing without disconnecting the female housing from a fluid conduit to which the female housing is attached;
      ii. a second annulus extending through the female cartridge body;
      iii. a second spring stop disposed within the second annulus, the second spring stop comprising a second guide channel;
      iv. a second valve seat disposed within the second annulus;
      v. a second valve slidably disposed within the second annulus, the second valve comprising:
         1. a second leading face disposed proximate the second valve seat;
         2. a second valve actuator extending from the second leading face, the second valve actuator dimensioned and configured to cooperatively engage an end of the male member first valve actuator;
         3. a second spring face distally disposed from the second leading face; and
         4. a second valve guide extending from the second spring face, at least a portion of the second valve guide extending through the second guide channel;
      vi. a second spring disposed intermediate the second spring stop and the second valve spring face, the second spring dimensioned and configured to receive the second valve guide therethrough and further dimensioned and configured such that movement of the second valve toward the female valve seat extends the second spring and movement of the second valve away from the female valve seat compresses the second spring; and c. the first valve actuator and the second valve actuator being dimensioned and configured to cooperatively urge their respective valves in opposite directions when the first valve actuator and the second valve actuator are cooperatively engaged, the first valve actuator and the second valve actuator further configured such that when the female and male cartridges are mated, movement of first actuator and the second actuator is limited to where the first valve and the second valve cannot seal against their respective valve seats, irrespective of fluid pressure.

17. A method of controlling fluid flow, comprising:
a. mating a female coupling member into a subsea assembly fluid conduit, the female coupling member comprising:
 i. a first open female housing end adapted to mate with the subsea assembly fluid conduit and a second female housing end;
 ii. a female cartridge selectively adapted to be removably received into the female housing second end and disposed at least partially within the female coupling member, the female cartridge comprising:
  1. a fastener portion;
  2. a female coupling inner bore;
  3. a first anchor disposed within a first portion of the female coupling inner bore;
  4. a seal mounted at least partially within a second portion of the female coupling inner bore;
  5. a first poppet valve slideably mounted within the female coupling inner bore intermediate the first anchor and the seal, the first poppet valve further comprising:
   a. a first tapered sealing surface dimensioned to form a selectively occlusive seal with the seal within the female coupling inner bore; and
   b. a first actuator extending from the first tapered sealing surface into a third predetermined portion of the female coupling inner bore, the first actuator comprising a first engagement end distally disposed from the first tapered sealing surface; and
  6. a first spring disposed intermediate the first poppet valve and the first anchor, the first spring further comprising:
   a. a first end in communication with the first poppet valve; and
   b. a second end in communication with the first anchor;
b. maneuvering a male coupling member which has been mated to a second fluid conduit to a position proximate the female coupling member, the male coupling member comprising a first open male housing end, a second male housing open end adapted to mate to the second fluid conduit, and a male cartridge inserted into the first open male housing end and disposed at least partially into the male housing, the male cartridge further comprising:
 i. a male coupling inner bore;
 ii. a fluid conduit interface dimensioned to attach to a fluid conduit and operatively interface with the fluid conduit to allow fluid flow through the male coupling inner bore;
 iii. a probe section disposed distally from the fluid conduit interface and dimensioned to fit within a predetermined portion of the female coupling inner bore;
 iv. a second anchor mounted at least partially at a first predetermined position within the male coupling inner bore;
 v. a second seal disposed at a second predetermined position within the male coupling inner bore;
 vi. a second poppet valve slideably mounted in the male coupling inner bore intermediate the second anchor and the second seal, the second poppet valve further comprising:
  1. a second tapered sealing surface dimensioned to form a selectively occlusive seal with the second seal; and
  2. a second actuator extending from the second tapered sealing surface into a third predetermined portion of the male coupling inner bore proximate the probe, the second actuator further comprising a second engagement end distally disposed from the second tapered sealing surface; and
 vii. a second spring disposed intermediate the second anchor and the second seal, the second spring further comprising:
  1. a first end in communication with the second poppet valve; and
  2. a second end in communication with the second anchor;
c. mating the female and male coupling members by:
 i. aligning the probe of the male coupling cartridge along a predetermined longitudinal axis of the first inner bore of the female coupling cartridge; and
 ii. advancing at least one of female or male coupling cartridges until the first and second actuators are slidably engaged along a substantially common longitudinal axis at their respective engagement ends, the female coupling inner bore forming a substantially common annulus with the male coupling inner bore when the female and male coupling cartridges are mated;
d. engaging the first and second actuators at their respective engagement ends to urge both the first and second poppet valves into respective positions where their respective tapered sealing surfaces are disengaged from their respective seals when the first and second actuators are engaged to either:
 i. compress the first spring in a first longitudinal direction with respect to a substantially common central axis of the male and female coupling inner bores, compression being limited by the first anchor at a first compression, and correspondingly tension the second spring in the first longitudinal direction, the decompression being limited by the second sealing face sealing against the second seal at a first predetermined decompression; or
 ii. compress the second spring in a second longitudinal direction with respect to the substantially common central axis, compression being limited by the second anchor at a second predetermined compression, and correspondingly tension the first spring in the second longitudinal direction, the decompression being limited the first sealing face sealing against the first seal at a second predetermined decompression; and
e. allowing fluid flow through the female coupling inner bore and the male coupling inner bore until fluid pressure within the female coupling inner bore and the male coupling inner bore is sufficient to either:
 i. urge the first actuator against the second actuator and overcome the second spring's pressure against the second poppet valve and allow the first sealing surface to seal against the first seal; or ii. urge the second actuator against the first actuator and overcome the first spring's pressure against the first poppet valve and allow the second sealing surface to seal against the second seal.

\* \* \* \* \*